US009211777B2

(12) United States Patent
Hashigaya et al.

(10) Patent No.: US 9,211,777 B2
(45) Date of Patent: Dec. 15, 2015

(54) VEHICLE AIR-CONDITIONING APPARATUS

(75) Inventors: Hideki Hashigaya, Shizuoka (JP); Naoki Fukumoto, Shizuoka (JP)

(73) Assignee: SUZUKI MOTOR CORPORATION, Shizuoka (JP)

( * ) Notice: Subject to any disclaimer, the term of this patent is extended or adjusted under 35 U.S.C. 154(b) by 552 days.

(21) Appl. No.: 13/532,008

(22) Filed: Jun. 25, 2012

(65) Prior Publication Data
US 2013/0014931 A1    Jan. 17, 2013

(30) Foreign Application Priority Data

Jul. 11, 2011 (JP) ................................. 2011-152908

(51) Int. Cl.
*B60H 1/00* (2006.01)
(52) U.S. Cl.
CPC ........ *B60H 1/00764* (2013.01); *B60H 1/00828* (2013.01); *B60H 1/00778* (2013.01)
(58) Field of Classification Search
CPC ........................ B60H 1/00764; B60H 1/00828
USPC .................................. 165/202, 287, 288, 41
See application file for complete search history.

(56) References Cited

U.S. PATENT DOCUMENTS

2011/0067422 A1* 3/2011 Ichishi et al. ................ 62/176.1

FOREIGN PATENT DOCUMENTS

| DE | 10 2007 030 540 A1 | 1/2009 |
|---|---|---|
| DE | 10 2009 040 877 A1 | 5/2010 |
| JP | 58-140442 A | 8/1983 |
| JP | 59-57010 A | 4/1984 |
| JP | 2001-341515 A | 12/2001 |

OTHER PUBLICATIONS

Office Action mailed Dec. 2, 2013 in German Patent Application No. 10 2012 211 672.9 (with an English translation) (10 pages).
Office Action mailed Jun. 5, 2014 in corresponding Chinese Patent Application No. 201210239741.6 (with an English translation) (13 pages).
Office Action mailed Dec. 29, 2014 in corresponding Chinese Patent Application No. 201210239741.6 (with an English translation) (8 pages).
Notification of Completion for Formalities of Registration mailed Apr. 30, 2015 in corresponding Chinese Patent Application No. 201210239741.6 (with an English translation) (4 pages).

* cited by examiner

*Primary Examiner* — Marc Norman
*Assistant Examiner* — Devon Russell
(74) *Attorney, Agent, or Firm* — Rothwell, Figg, Ernst & Manbeck, P.C.

(57) ABSTRACT

A vehicle air-conditioning apparatus 10, installed in a vehicle having a no idling system (in which the engine stops rather than idling). The apparatus includes a blower fan 12 for sending air-conditioning air for temperature control in a vehicle compartment R to the vehicle compartment; a heater core 14 for heating the air-conditioning air by heat exchange with cooling water of an engine; and an automatic air controller 18 for executing temperature regulation control in the vehicle compartment by regulating an air-conditioning air volume to be heat exchanged with the heater core. The automatic air controller controls, on heating, during a no idling operation, driving of a blower fan so as to supply a determined air volume in response to the ambient air temperature detected by an ambient air temperature sensor 22a.

1 Claim, 7 Drawing Sheets

VEHICLE AIR-CONDITIONING APPARATUS

CROSS-REFERENCE

This document claims priority to Japanese Application Number 2011-152908, filed Jul. 11, 2011, the entire content of which is hereby incorporated by reference.

FIELD OF THE INVENTION

The present invention relates to a automotive air-conditioning apparatus and, in particular, to air-conditioning control when the vehicle is not idling.

BACKGROUND ART

A variety of vehicles are known which drive an engine (internal-combustion engine) without idling for stopping operation of the engine, at predetermined timing, while a vehicle is stopped in its travel, for saving energy saving and abatement of environmental pollution.

In a vehicle, on heating, warm air produced by heat exchanging between cooling water of the engine is provided or inducted inside of a vehicle compartment to provide a comfortable environment therein. However, when the engine stops, as a pump circulating cooling water residing in a heat exchanger stops its operation, it does not replenish heat storage volume used for heating of warm air. Accordingly, it falls into a situation where temperature of the heat exchanger drops in accordance with time elapsed from the engine stopping, such that it will be unable to blow out sufficiently heated warm air inside of the vehicle compartment.

In the vehicle of this kind, as heating becomes poor where the temperature of warm air drops, with the engine stop on no idling, and when ambient air temperature is lower than a given temperature, it has been heretofore proposed to prohibit execution of the no idling or engine stop (see Patent Document 1). Further, because on no idling, it is difficult to sufficiently heat the cool ambient air, it has been proposed to switch from ambient air induction where ambient air is inducted to heat a vehicle compartment to interior air circulation where air in the vehicle compartment is circulated (see Patent Document 2). Furthermore, when execution of the idle stop is not prevented, it has been proposed to switch to interior air circulation where little air volume is supplied as cold ambient air (see Patent Document 3).

PRIOR ART DOCUMENT

Patent Document

Patent Document 1: JP Sho58-140442 A
Patent Document 2: JP Sho59-57010 A
Patent Document 3: JP 2001-341515 A

SUMMARY OF THE INVENTION

Problem to be Solved

Meantime, as heating in the vehicle, warm air in response to temperature in the vehicle compartment is the optimum air volume, and the passenger feels, only at this time, comfortability when the warm air touches passenger's skin. In the above heating, a passenger feels cool when warm air with temperature lower than that in the vehicle compartment is blown strongly to the passenger's skin, even though the warm air is warmer as compared with the ambient air. Additionally, there are cases where comfort is sometimes impaired, and a passenger feels uncomfortable due to low air volume.

In short, in the heating on such no idling, when the no idling is not prohibited as is being disclosed in Patent Document 1, there are cases where continuously ventilating constant air volume, regardless of lowered temperature of the warm air, as is being disclosed in Patent Documents 2 and 3, the warm air not suitable for introduction into the vehicle compartment is blown out to a passenger, and consequently the passenger occasionally feels discomfort.

An objective of the present invention is to provide a vehicle air-conditioning apparatus which provides comfortable heating on no idling conditions.

Solution to the Problem

According to a first aspect of the vehicle air-conditioner to solve the above-identified problems, the invention provides a vehicle air-conditioning apparatus, installed in a vehicle, having a function for automatically stop an engine when an automatic stopping condition is met, and for restarting the engine when a vehicle restart condition is met. The air-conditioning apparatus includes: a blower fan for sending air-conditioning air for temperature control to a vehicle compartment; a heat exchanger for heating the air-conditioning air by heat exchanging with cooling water for the engine; and a temperature control unit for executing temperature regulation control in the vehicle compartment by regulating a heat exchange rate of the air-conditioning air between the heat exchanger and the air-conditioning air. In addition, a temperature detection unit detects temperature of the air-conditioning air before heating the air-conditioning air by the heat exchanger; and an air volume control unit controls, on heating, during an automatic stop of the engine, driving of the blower fan so as to increase air volume in response to the air-conditioning air temperature detected by the temperature detection unit.

According to a second aspect of the vehicle air-conditioning apparatus to solve the above-identified problems, the invention provides, in addition to the above specific matters of the first aspect, an ambient air flow path to take, as air-conditioning air, ambient air outside of the vehicle compartment. In addition, the temperature detection unit detects temperature of the ambient air to be taken in, as air-conditioning air, through the ambient air flow path.

According to a third aspect of the vehicle air-conditioning apparatus to solve the above-identified problems, the invention provides, in addition to the above specific matters of the first aspect, an interior air flow path to take, as air-conditioning air, interior air inside of the vehicle compartment. In addition, the temperature detection unit detects the temperature of the interior air to be taken in, as air-conditioning air, through the interior air flow path.

According to a fourth aspect of the vehicle air-conditioning apparatus to solve the above-identified problems, the invention provides, in addition to the above specific matters of the second aspect, an interior air flow path for taking, as air-conditioning air, interior air inside of the vehicle, and a flow path switching unit for switching so as to select either the ambient air flow path or the interior air flow path. In addition, the temperature detection unit detects temperature of the air-conditioning air to be taken in though the selected ambient air flow path or the interior air flow path.

Advantageous Effect of the Invention

According to one aspect of the present invention, the invention enables the provision of heated warm air, with an air volume determined in response to temperature of temperature controlled air (ambient air or interior air) before heating by means of the heat exchanger, at the time the engine is temporarily stopped in a re-startable manner, during execution of the no idling condition. Thus, heating can be continued within the limits, as much as possible, even on the no idling operation, without feeling discomfort due to the supply of warm air at an air volume not suited to the temperature.

DESCRIPTION OF EMBODIMENTS

A description will be made in details to embodiments of the present invention. FIGS. 1 to 4 are views showing a first embodiment of a vehicle air conditioning apparatus according to the present invention.

First Embodiment

Figure 1:
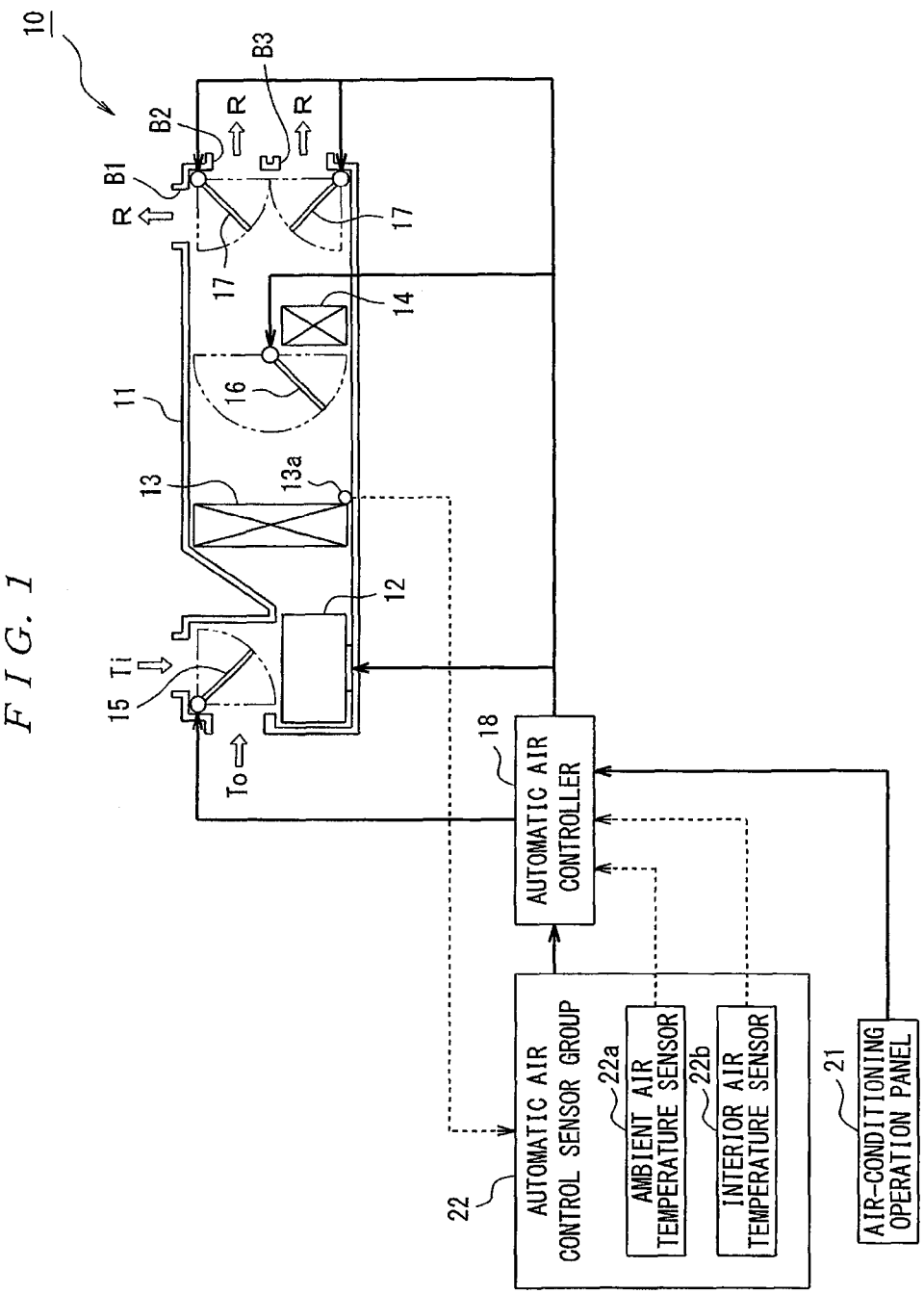
FIG. 1 is a view showing a first embodiment of a vehicle air conditioning apparatus according to the present invention, and is a conceptual block diagram showing an overall configuration.

In FIG. 1, an air conditioning apparatus 10 is a Heating Ventilating and Air Conditioning (HVAC) system for heating, ventilating, and air conditioning inside a vehicle compartment R of a car (vehicle) with an engine. The air conditioning apparatus 10 includes a blower fan (ventilator) 12, an evaporator 13, a heater core 14, an inlet damper (flow path switching unit) 15, an air-mixing damper 16, an outlet damper 17, and an automatic air controller (temperature control unit) 18.

The blower fan 12 forms a flow of air by forcibly drawing air in an air duct 11 from upstream and by blowing out air toward the downstream side. The evaporator 13 cools air passing through the air duct 11. The heater core 14 heats air passing through the air duct 11. The inlet damper 15 switches an air flow path through which the blower fan 12 takes air in the air duct 11 in an outside intake port (ambient air flow path) $T_o$ or in an inside intake port (interior air flow path) $T_i$ of the vehicle compartment R. The air-mixing damper 16 regulates part of air passing through the air duct 11 so as to direct it into an air flow path contacting the heater core 14. The outlet damper 17 switches a flow path to blow out air from the air duct 11 into any of duct outlets B1 to B3 installed in the vehicle compartment R. The automatic air controller 18 comprehensively controls each of the units to maintain the vehicle compartment R in comfortable environment.

Herein, the evaporator 13 causes a compressor (not shown) to circulate in such a manner as to expand and vaporize refrigerant with an expansion valve before inducting the refrigerant liquefied by a condenser (steam condenser). The evaporator 13 is installed in the air duct 11 and cools air passing therethrough (contacting therewith) by utilizing vaporization heat produced by evaporating the refrigerant.

The heater core 14 is installed in the air duct 11, such that heat air passing through the air duct 11 is heated, utilizing heat exchange effected in a radiator that circulates cooling water to an engine (not shown). The heater core 14 constitutes a heat exchanger.

The automatic air controller 18 (hereafter referred simply to as an air-conditioning controller 18) is provided with an air-conditioning operation panel 21, and an automatic air control sensor group 22 respectively connected thereto. The air-conditioning operation panel 21 provides input settings of various air-conditioning conditions, etc. The automatic air-conditioning control sensor group 22 includes an evaporator temperature sensor, an interior air temperature sensor, an ambient air temperature sensor, a solar radiation sensor, a water temperature sensor, a vehicle speed sensor, a refrigerant pressure sensor, and a humidity sensor, for detecting various situations or conditions, etc.

The air-conditioning controller 18 comprehensively controls each of the units 12 to 17 for executing air-conditioning control inside of the vehicle compartment R, based on various air-conditioning operation panel information to be input from the air-conditioning operation panel 21 and various detected information to be captured by the automatic air-conditioning control sensor group 22, in accordance with a previously prepared control program, as with a typical air-conditioning controller. In this connection, each damper 15 to 17 in the air duct 11 is operated to energize a drive motor (not shown) by the air-conditioning controller 18 for forming a desired flow path. Further, in FIG. 1, reference numeral 13a denotes a temperature sensor to detect temperature of the evaporator 13.

Incidentally, in the air-conditioning apparatus 10, the air-conditioning controller 18 cooperatively operates with a main controller (control unit (not shown)) for comprehensively controlling each of the units at a vehicle body side to maintain the vehicle compartment R in comfortable environment.

Moreover, the car with engine has a no idling system (in other words, instead of idling, the engine is stopped) to immediately put an engine into a re-startable state and to temporarily stop the engine when prescribed requirements are met. The no idling feature is executed by the main controller.

The air-conditioning controller 18 of the air-conditioning apparatus 10 executes air-conditioning control conforming to the no idling condition when the car with engine executes the no idling operation.

The air-conditioning controller 18 is configured to control driving of the blower fan 12 so as supply an air volume in response to ambient air temperature (air-conditioning air temperature) information obtainable by detecting the air temperature passing through the outside intake port $T_o$ through which the ambient air temperature sensor (temperature detection unit) 22a in the automatic air control sensor group 22, on heating, during the no idling, air in the vehicle compartment R. In other words, the air conditioning controller 18 constitutes the air volume control unit. Note that the ambient air temperature sensor 22a may also be configured to directly detect temperature outside of the vehicle compartment.

Figure 2:
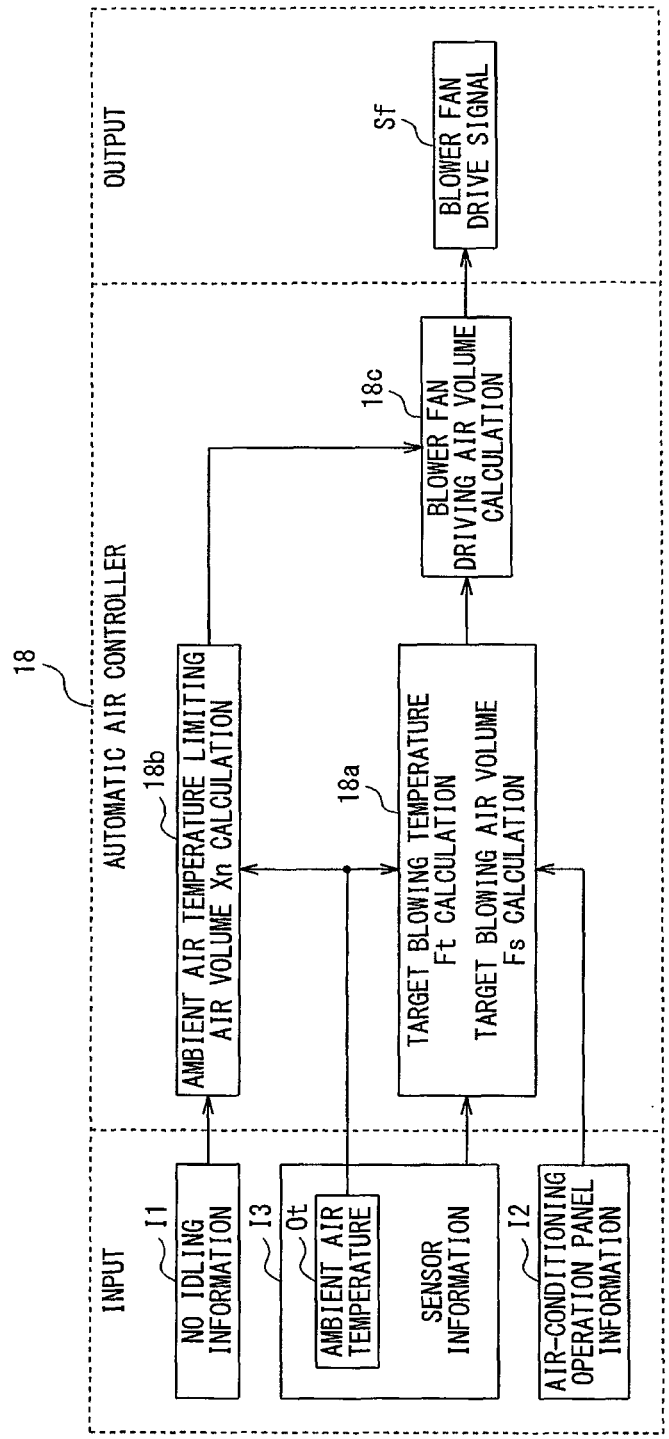
FIG. 2 is a block diagram showing communication of various information.

More specifically, the air-conditioning controller 18 executes air conditioning so as to create a comfortable interior environment, while taking fresh air in the vehicle compartment R, as far as no input instructions are given through the air-conditioning operation panel 21 when executing air conditioning in the vehicle compartment R. At this time, the air-conditioning controller 18 is, as shown in FIG. 2, configured to function as an air-conditioning condition calculating unit 18a, an air-conditioning condition limiting unit 18b, and an air volume calculating unit 18c in accordance with the control program to conduct input and output control of various information, for executing driving control of each of the units.

The air-conditioning controller 18 calculates, as the air-conditioning condition calculating unit 18a, a target blowing temperature $F_t$ and a target blowing air volume $F_s$ of air-conditioning air to be blown inside of the vehicle compartment R from the duct outlets B1 to B3 based on air-conditioning operation panel information I2 and various determined information I3.

The air-conditioning operation panel information I2 is input information, such as vehicle compartment R temperature, automatic air-conditioning, or manual air-conditioning input and set for instruction from the air-conditioning operation panel 21.

Further, the various detection information I3 is detected information, such as evaporator temperature, in-vehicle (interior air) temperature, solar radiation, water temperature, vehicle speed, refrigerant pressure, humidity and ambient air temperature $O_t$.

Figure 3:
FIG. 3 is a control map showing a relationship with ambient air temperature to be used in air volume control.

The air-conditioning condition limiting unit 18b is configured to capture limiting air volume $X_n$ in response to ambient air temperature $O_t$ detected by the ambient air temperature sensor 22a, when no idling information I1 notifying a control command concomitant with execution of the no idling operation from the main controller, at the start of execution, or during execution of the air conditioning control. The limiting air volume $X_n$, as shown e.g., in FIG. 3, is previously set so as to supply a smaller air volume $X_n$ (X1 to X6), as temperature drops, depending on the ambient air temperature $O_t$, every 10° C. (10 degrees Celsius) ranging from −20° C. to 30° C. This limiting air volume $X_n$ is calculated, as an air volume value, in response to the ambient air temperature $O_t$ based on a corresponding air volume indicated in an air volume map. It is to be understood that a calculation of the limiting air volume $X_n$ is not necessarily limited thereto, the calculation may be made by substituting parameter information, such as the ambient air temperature $O_t$, target blowing temperature $F_t$, or target blowing air volume $F_s$ for an arithmetic expression.

The air volume calculating unit 18c selects and captures blower fan driving air volume information for driving the blower fan 12, with the least air volume within the limits of the target blowing air volume $F_s$ calculated by the air-conditioning condition calculating unit 18a or the limiting air volume $X_n$ calculated by the air-conditioning condition limiting unit 18b to generate a blower fan drive signal $S_f$, for activating a drive motor of the blower fan 12.

Figure 4:
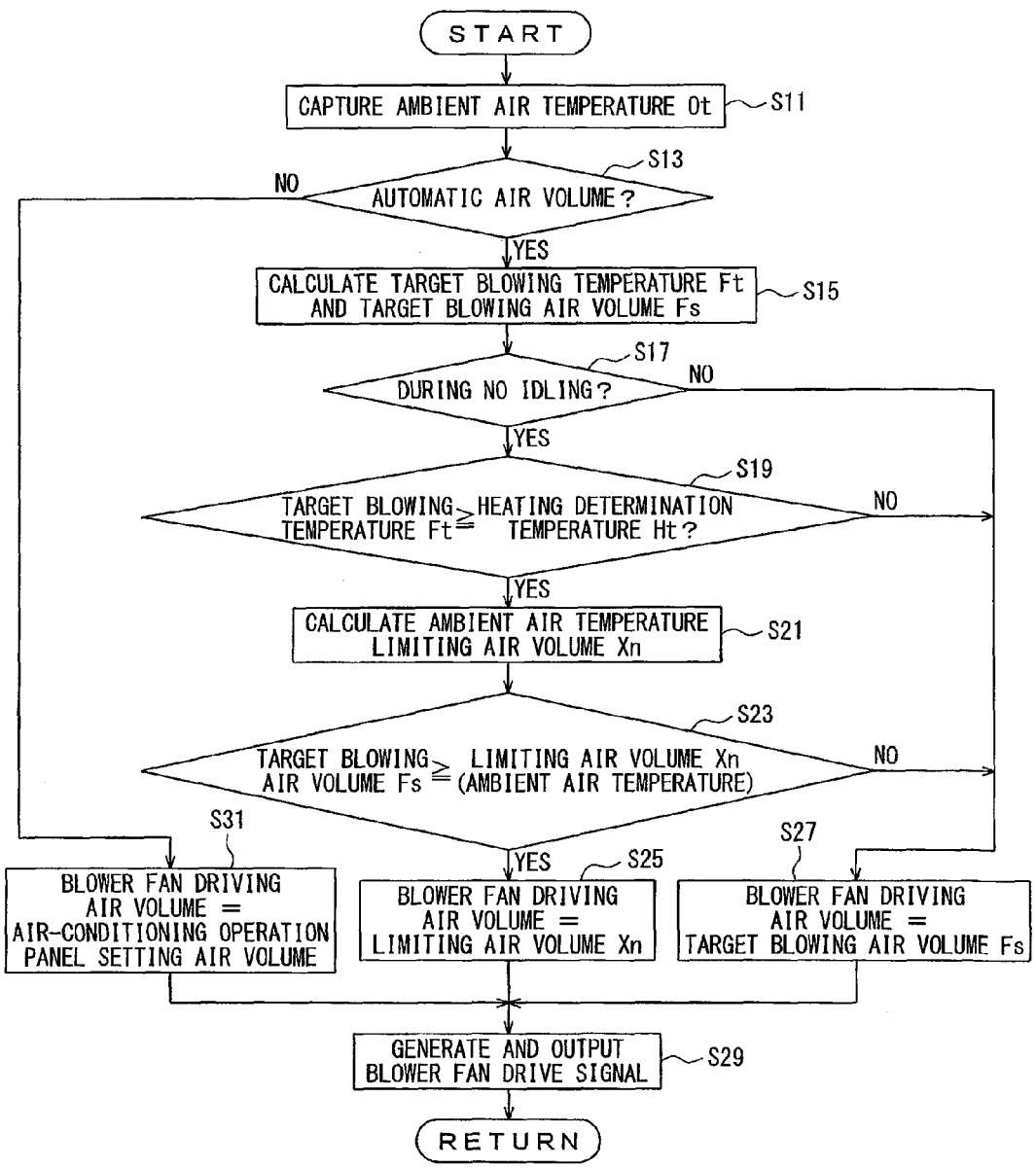
FIG. 4 is a flow chart showing an air-conditioning control procedure (method)

Specifically, the air-conditioning controller 18 executes an air-conditioning procedure (method) expressed by a flow chart shown in FIG. 4.

Upon reception of an air-conditioning start instruction operated by a passenger from the air-conditioning operation panel 21, the air-conditioning controller 18 receives, at the outset, detection information I3 containing the ambient air temperature Ot (step S11), and also receives air-conditioning operation panel information I2 input and set by the air-conditioning operation panel 21. Then, the air-conditioning controller 18 confirms whether an automatic air volume for automatically setting air volume is selected (step S13). If the automatic air volume is selected, the target blowing temperature $F_t$ and the target blowing air volume $F_s$ of air-conditioning air are calculated based on the setting temperature in the vehicle compartment R by the air operation panel information I2 or various detection information I3 detected by the automatic air control sensor group 22 (step S15).

After this, the air-conditioning controller 18 confirms whether the no idling operation is in process (step S17). If the no idling is in process, a comparison is made between the calculated target blowing temperature $F_t$ and the heating determination temperature $H_t$ (step S19). If the target blowing temperature $F_t$ is equal to or higher than the heating determination temperature $H_t$, an air volume limiting control is executed. Here, the heating determination temperature $H_t$ should use a condition to be used for every air-conditioning control where heating is determined to be necessary. Alternatively, e.g., a comparison may be made between the target blowing temperature $F_t$ and the current blowing temperature (it may be vehicle compartment temperature R) Bt, and then the air volume control may be executed when the target blowing temperature $F_t$ is equal to or higher than the current blowing temperature $B_t$.

In the air volume limiting control, the air-conditioning controller 18 calculates and captures the limiting air volume $X_n$ in response to the already captured ambient air temperature $O_t$ (step S21), and compares it with the target blowing air volume $F_s$ (step S23).

If the target blowing air volume $F_s$ is equal to or higher than the limiting air volume $X_n$, the air-conditioning controller 18 selects, as the blower fan driving air volume, the limiting air volume $X_n$ (step S25). Otherwise, if the target blowing air volume $F_s$ is less than the limiting air volume $X_n$, the air-conditioning controller 18 selects the target blowing air volume $F_s$, as the blower fan driving air volume (step S27). As a result, the air-conditioning controller 18 generates an output for the blower fan drive signal (step S29), and then the drive motor of the blower fan 12 is activated.

Thereby, the blower fan 12 can blow, during execution of the no idling operation, temperature-conditioning air heated by the heater core 14 in the vehicle compartment R, with the target air volume $F_s$ or the limiting air volume $X_n$, whichever is lower. On this account, it may avoid blowing out of cold air from the duct outlets B1 to B3, with the large target blowing air volume $F_s$, and blowing against the passenger seated in the vehicle compartment R, to prevent the passenger from feeling discomfort, even when the heater core 14 cannot heat the temperature-conditioning air passing through the air duct 11 up to the target blowing temperature $F_t$ since the radiator is unable to keep high temperature due to engine stop caused by execution of the no idling operation. Further, it may avoid blowing out of cold air from the duct outlets B1 to B3, and blowing against the passenger seated in the vehicle compartment R, to prevent the passenger from feeling discomfort, since the lower the ambient air temperature $O_t$, the smaller the set value for the limiting air volume $X_n$. Yet further, the air volume limiting offers an advantage to prevent maintaining of an air volume that would be unnecessary or wasteful, thereby conserving energy consumption.

If confirmation is made in step S13 that the automatic air volume is not selected and set, air volume is set on the air-conditioning operation panel 21 as it stands, as blower fan driving air volume (step S31). Otherwise, if confirmation is not made in step S17 that the no idling is in process, if the target blowing temperature $F_t$ is lower than heating determination temperature $H_t$ in step S19, or if the target blowing air volume $F_s$ is less than the limiting air volume $X_n$ in step S23, it is no longer needed to forcibly limit the blower fan air volume. Therefore, a blower fan drive signal is generated and output as it is in response to the target blowing air volume $F_s$ to drive the blower fan 12 (steps S27 and S29).

Thus, in the present embodiment, when it is hard to heat temperature-conditioning air to a sufficient degree by the heater core 14 as the no idling is in process which causes the engine to temporally stop in a re-startable manner, it enables blowing out of the air-conditioning air in the vehicle compartment R with the limiting air volume $X_n$ reduced in response to ambient air temperature. This avoids the feeling of discomfort due to blowing of cold temperature-conditioning air against a passenger, positively decreasing in temperature in the vehicle compartment, or unduly consuming large amounts of electricity.

Second Embodiment

Figure 5:
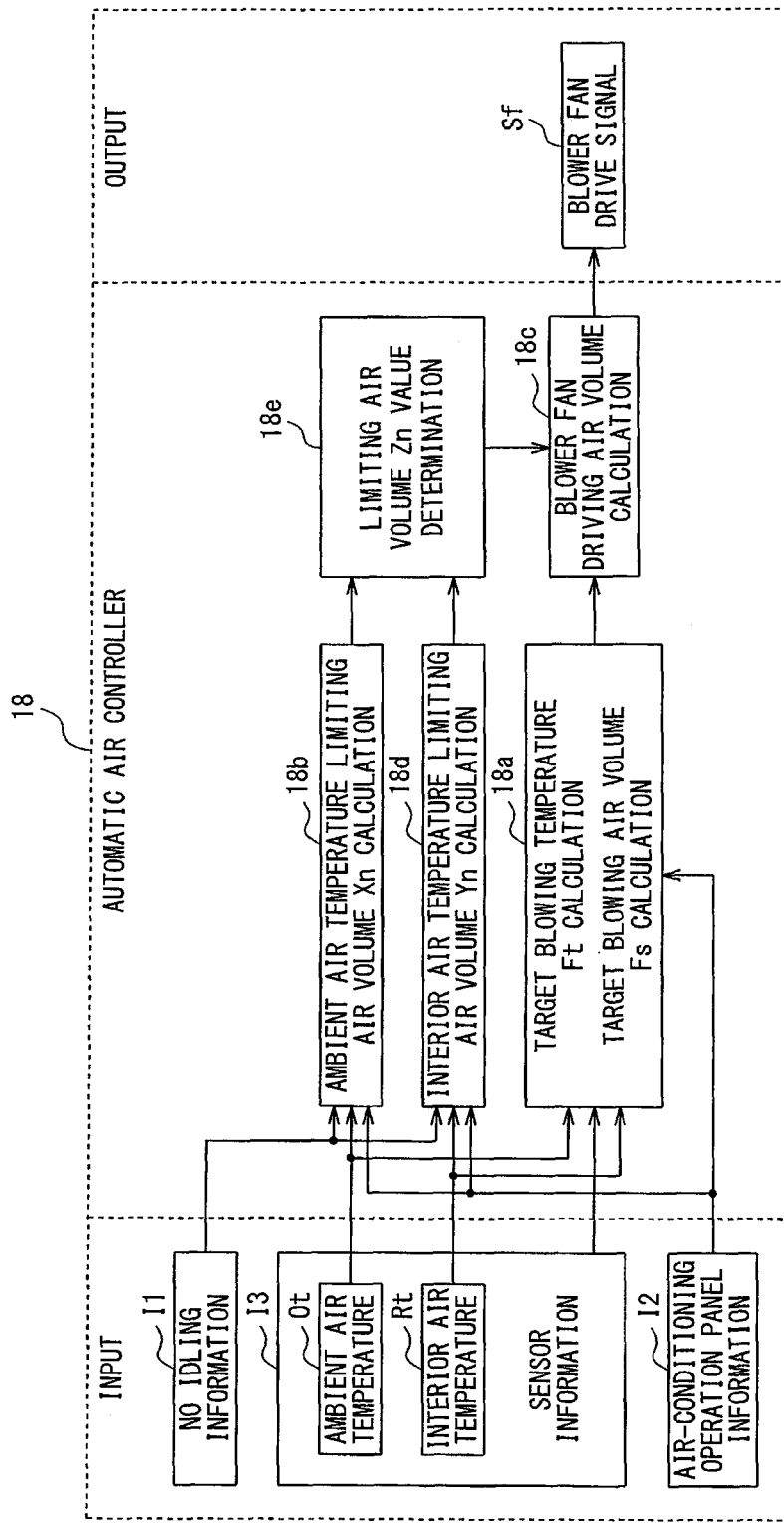
FIG. 5 is a view showing a second embodiment of a vehicle air conditioning apparatus according to the present invention, and is a block diagram showing communication of various information.
Figure 6:
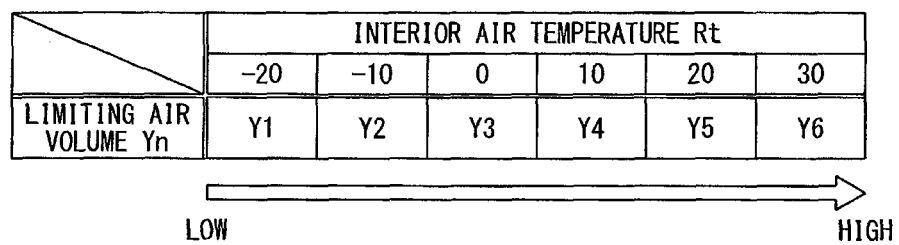
FIG. 6 is a control map showing a relationship with interior air temperature to be additionally used in the air volume control.
Figure 7:
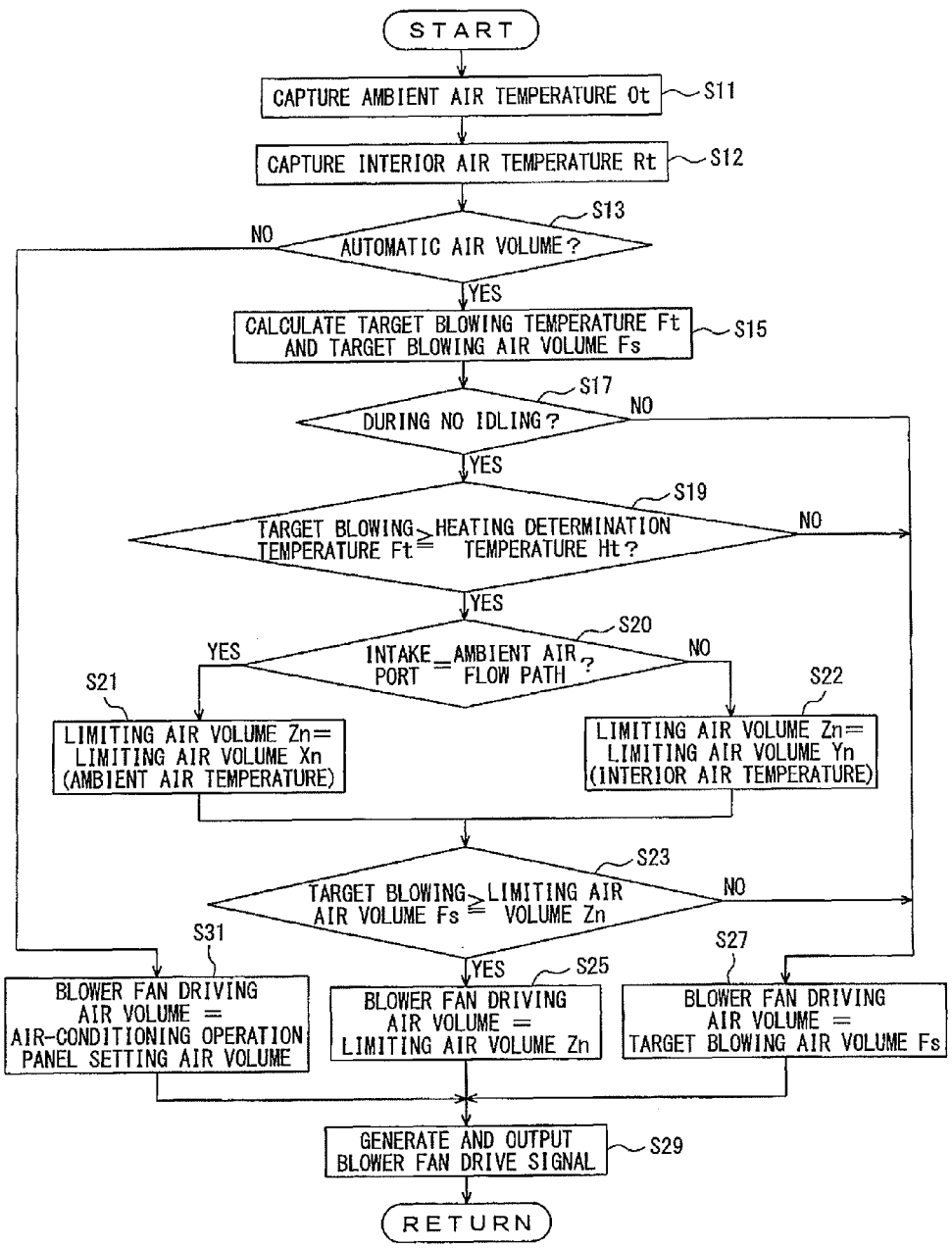
FIG. 7 is a flowchart showing an air-conditioning control procedure (method).

Then, FIGS. 5 to 7 are views showing a second embodiment of the vehicle air-conditioning apparatus according to the present invention. Here, since the present embodiment is arranged in the substantially same manner as the aforesaid embodiment, an explanation will be made exclusively to its features by applying the same reference numeral to the same arrangement.

In FIG. 5, the air-conditioning controller 18 of the air conditioning apparatus 10 is configured to control, on heating, during execution of the no idling, driving of the blower fan 12 so as to supply the volume, considering not only ambient air temperature information in the outside intake port $T_o$ which is detected by the ambient air temperature sensor 22a belonging to the automatic air control sensor group 22, but also interior air temperature (air-conditioning air temperature) information in the inside intake port $T_i$ through which interior air is taken in, which is detected by the interior air temperature sensor (temperature detection unit) 22b.

More precisely, the air-conditioning controller 18 is configured to function also as an air-conditioning condition limiting unit 18d and a air-conditioning condition limitation determining unit 18e in accordance with the control program, in addition to an air-conditioning condition calculating unit 18a, an air-conditioning condition limiting unit 18b, and an air volume calculating unit 18c, to perform input and output control of various information to thereby execute driving control of each of the units.

The air-conditioning condition limiting unit 18d captures limiting air volume $Y_n$ in response to the interior air temperature $R_t$ detected by the interior air temperature sensor 22b, when no idling information I1 notifying a control command concomitant with the no idling operation (engine stopped) from the main controller, at the start of execution, or during execution of the air-conditioning control, as with the air-conditioning condition limiting unit 18b. The limiting air volume $X_n$ and $Y_n$ are selected and calculated, depending on the setting of ambient air induction or interior air circulation, on heating, included in the air-conditioning operation panel information I2 input by the air-conditioning operation panel 21. The limiting air volume Yn is, as shown e.g., in FIG. 6, previously set such that the limiting air volume $Y_n$ is reduced to smaller air volume $Y_n$ (Y1 to Y6), as temperature drops to a lower temperature in response to the interior air temperature $R_t$, every 10° C. (degree), ranging from −20° C. to 30° C. The limiting air volume $Y_n$ is calculated, as an air volume value, in response to the interior air temperature $R_t$, based on the corresponding air volume shown in the air volume map. It is to be understood that a calculation of the limiting air volume $Y_n$ is not necessarily limited thereto, rather it may substitute parameter information, such as the interior air temperature $R_t$, the target blowing temperature $F_t$, and the target blowing air volume $F_s$, etc., for an arithmetic expression to calculate the limiting air volume $Y_n$. Also, while an explanation is made, by way of example, in a case where the limiting air volume $X_n$ and $Y_n$ are selected and calculated, this embodiment is not necessarily limited thereto, and the limiting air volume $X_n$ and $Y_n$ may be selected after calculation.

The air-conditioning condition limitation determining unit 18e adopts, on heating, as limiting air volume $Z_n$, one of the limiting air volume $X_n$ and $Y_n$ selected and calculated in response to the setting of the ambient air induction or the interior air circulation, included in the air-conditioning operation panel information I2 input by the air-conditioning operation panel 21. The air volume calculating unit 18c selects and captures blower fan driving air volume information for driving the blower fan 12, with the least air volume within the limits of its limiting air volume $Z_n$ or the target blowing air volume $F_s$ to generate a blower fan drive signal $S_f$ to thereby activate the driving motor for the blowing fan 12.

Specifically, the air-conditioning controller 18 executes an air-conditioning procedure (method) expressed by a flow chart shown in FIG. 7.

Upon reception of an air-conditioning instruction input operated by a passenger from the air-conditioning operation panel 21, the air-conditioning controller 18 receives, at the outset, detection information I3 containing the ambient air temperature $O_t$ and the interior air temperature $R_t$, as with the above-mentioned embodiment, and also receives air-conditioning operation panel information I2 (step S11 and S12). Then, the air-conditioning controller 18 confirms whether the automatic air volume is selected (step S13). If the automatic air volume is selected, the target blowing temperature $F_t$ and the target blowing air volume $F_s$ of the air-conditioning air are calculated based on various detected information I3 (step S15). Even after this, the air-conditioning controller 18 confirms whether the idle stop is in process (step S17), as with the above-mentioned embodiment. If the no idling operation is in process, a comparison is made between the calculated target blowing temperature $F_t$ and the heating determination temperature $H_t$ (step S19). If the target blowing temperature $F_t$ is higher than or equal to the heating determination temperature $H_t$, the air volume limiting control is executed.

In the air volume limiting control, the air-conditioning controller 18 confirms whether heating is selected where an intake port implemented by the inlet damper 15 is switched to an ambient air flow path to induct ambient air through the outside intake port $T_o$ according to a setting instruction of an ambient air induction or an interior air circulation included in the air-conditioning operation panel information I2 (step S20). If the ambient air induction is selected, the air-conditioning controller 18 calculates and captures the limiting air volume $X_n$ in response to the already captured ambient air temperature $O_t$, as with the above-mentioned embodiment. After that, the limiting air volume $X_n$ is taken as the limiting air volume $Z_n$ (step S21). On the other hand, if the ambient air induction is not selected and the interior air circulation entering and circulating air inside of the vehicle compartment R through the inside intake port Ti of the interior air flow path, the air-conditioning controller 18 calculates and captures the limiting air volume $Y_n$ in response to the already captured interior air temperature $R_t$. After that, the limiting air volume $Y_n$ is taken as the limiting air volume $Z_n$ (step S22).

Afterwards, the air-conditioning controller 18 compares one limiting air volume $Z_n$ of the selected, calculated, and captured limiting air volume $X_n$ and $Y_n$ with the target blowing air volume $F_s$, as with the afore-mentioned embodiment (step S23). If the target blowing air volume $F_s$ is higher than or equal to the limiting air volume $Z_n$, the limiting air volume $Z_n$ is selected, as the blower fan driving air volume (step S25). Otherwise, if the target blowing air volume $F_s$ is less than the limiting air volume $Z_n$, the target blowing air volume $F_s$ is selected, as the blower fan driving air volume (step S27). Then, the air-conditioning controller 18 generates and outputs a blower fan drive signal (step S29), and activates a drive motor for the blower fan 12.

Thereby, the blower fan 12 can blow temperature-conditioning air heated by the heater core 14 in the vehicle compartment R, with the target blowing air volume Fs, or the limiting air volume $Z_n$, whichever is the least air volume, selected in response to the interior air temperature $R_t$ in the vehicle compartment R, even when the interior air circulation is selected and instructed during execution of the no idling operation.

In this way, the present embodiment allows preventing inconvenience, such as a case where a passenger feels discomfort, coping not only with heating by ambient air induction, but also with heating by interior air circulation, in addition to the effects and advantages affected by the aforesaid embodiments.

It should be noted that the scope of the present invention is not limited to the exemplary embodiments, described and illustrated, rather the embodiment are intended to encompass all the embodiments offering the equivalent effects to those the present invention aims at. Additionally, the scope of the invention is not limited to the combination of features of the present examples of embodiments as alternate combinations are possible with the scope of the claims.

INDUSTRIAL APPLICABILITY

It is to be understood that the present invention is not necessarily limited to the foregoing embodiments, the present invention may be embodied in various and different forms, within the limits of the technical idea, without being limited to the aforesaid embodiments.

10: air conditioning apparatus
11: air duct
12: blower fan
13: evaporator
14: heater core
15: inlet damper
16: air-mixing damper
17: outlet damper
18: automatic air controller
18a: air-conditioning condition calculating unit
18b, 18d: air-conditioning condition limiting unit
18c: air volume calculating unit
18e: air-conditioning condition limitation determining unit
21: air-conditioning operation panel
22: automatic air control sensor group
22a: ambient air temperature sensor
22b: interior air temperature sensor
B1 to B3: duct outlet
R: vehicle compartment
Ti: inside intake port
To: outside intake port

The invention claimed is:

1. A vehicle air-conditioning apparatus, installed in a vehicle, having a function for automatically stopping an engine when an automatic stop condition is met, and for restarting the engine when a vehicle restart condition is met, the air-conditioning apparatus comprising:

a blower fan for sending air-conditioning air for temperature control to a vehicle compartment;

a heat exchanger for heating the air-conditioning air by heat exchanging with cooling water for the engine;

a temperature control unit for executing temperature regulation control in the vehicle compartment by regulating a heat exchange rate of the air-conditioning air between the heat exchanger and the air-conditioning air;

an interior air flow path to draw, as air-conditioning air, interior air from inside of the vehicle compartment;

an ambient air flow path to draw, as air-conditioning air, ambient air from outside of the vehicle compartment; and a flow path switching unit for selecting a flow path by switching between the ambient air flow path or the interior air flow path; wherein an air volume map is selected in response to the flow path selected by the flow path switching unit when the engine is automatically stopped when the automatic stop condition is met;

a temperature detection unit for detecting temperature of the air-conditioning air drawn through the interior air flow path or the ambient air flow path before heating the air-conditioning air by the heat exchanger; and an air volume control unit for determining, on heating, when the engine is automatically stopped when the automatic stop condition is met, an air volume from the air volume map selected in response to the flow path selected by the flow path switching unit, and with the air volume determined in response to the air-conditioning air temperature detected by the temperature detection unit such that the determined air volume is reduced as the air-conditioning air temperature drops, and for controlling driving of the blower fan so as to supply air at the determined air volume.

* * * * *